United States Patent
Bonnet

[11] Patent Number: 5,988,356
[45] Date of Patent: Nov. 23, 1999

[54] AUTOMATED DIVERTER CAPABLE OF SORTING BULKY ARTICLES

[75] Inventor: Henri Bonnet, Atlanta, Ga.

[73] Assignee: United Parcel Service of America, Inc., Atlanta, Ga.

[21] Appl. No.: 08/925,884

[22] Filed: Sep. 8, 1997

[51] Int. Cl.[6] .................................................. B65G 37/00
[52] U.S. Cl. ................ 198/598; 198/369.5; 198/370.08; 198/370.1
[58] Field of Search ................................ 198/367, 369.5, 198/370.08, 370.1, 436, 442, 598, 890

[56] References Cited

U.S. PATENT DOCUMENTS

| | | |
|---|---|---|
| 235,128 | 12/1880 | Cook . |
| 1,044,547 | 11/1912 | Liggett . |
| 1,753,036 | 4/1930 | Williamson et al. . |
| 1,808,134 | 6/1931 | Gothardt et al. . |
| 1,822,930 | 9/1931 | Keller ...................................... 198/367 |
| 2,212,702 | 8/1940 | Scott . |
| 3,093,236 | 6/1963 | McLaughlin ....................... 198/370.08 |
| 3,104,755 | 9/1963 | Zuercher . |
| 3,139,965 | 7/1964 | Eggert ..................................... 198/367 |
| 3,198,308 | 8/1965 | Driesch et al. ......................... 198/442 |
| 3,522,876 | 8/1970 | Purdy . |
| 3,580,141 | 5/1971 | Richter . |
| 3,583,545 | 6/1971 | Hovekamp . |
| 3,799,323 | 3/1974 | Schneider . |
| 3,835,979 | 9/1974 | Calvert et al. . |
| 3,986,596 | 10/1976 | Hamilton ............................... 198/442 |
| 4,054,201 | 10/1977 | Rollinger . |
| 4,147,248 | 4/1979 | Kurczak et al. . |
| 4,295,559 | 10/1981 | Neal et al. . |
| 4,326,624 | 4/1982 | Ewertowski et al. . |
| 4,364,465 | 12/1982 | Kraft et al. . |
| 4,643,291 | 2/1987 | Counter et al. ......................... 198/598 |
| 4,711,357 | 12/1987 | Langenbeck et al. . |
| 4,723,647 | 2/1988 | Norton et al. . |
| 4,813,526 | 3/1989 | Belanger . |
| 4,848,558 | 7/1989 | Rechsteiner ............................ 198/436 |
| 4,867,299 | 9/1989 | Fukuoka et al. . |
| 5,090,549 | 2/1992 | Thiel . |
| 5,188,210 | 2/1993 | Malow .................................. 198/369.5 |
| 5,284,252 | 2/1994 | Bonnet . |
| 5,383,760 | 1/1995 | Cawley et al. . |
| 5,400,895 | 3/1995 | Hollingsworth et al. . |
| 5,421,446 | 6/1995 | Koch et al. . |
| 5,430,282 | 7/1995 | Smith et al. . |
| 5,438,188 | 8/1995 | Surka . |
| 5,582,284 | 12/1996 | Calladine et al. . |
| 5,655,643 | 8/1997 | Bonnet ............................... 198/370.08 |
| 5,810,149 | 9/1998 | Sandberg et al. ....................... 198/436 |

FOREIGN PATENT DOCUMENTS

| | | |
|---|---|---|
| 0517110 | 12/1992 | European Pat. Off. . |
| 2741788 | 1/1979 | Germany ............................... 198/442 |
| 3422150 | 12/1985 | Germany . |

*Primary Examiner*—William E. Terrell
*Assistant Examiner*—Khoi H. Tran
*Attorney, Agent, or Firm*—Jones & Askew, LLP

[57] ABSTRACT

Provided is an improved sorter assembly that is capable of directly receiving articles from multiple upstream sources and directly sorting to multiple downstream destinations, and that can sort a wide variety of articles, including heavy, bulky articles. The sorter assembly includes a carrying conveyor having a conveying surface that carries the articles being sorted. The carrying conveyor carries articles in a longitudinal direction between an upstream end and a downstream end of the carrying conveyor. The sorter assembly also includes a diverter that extends perpendicularly from and moves across the conveying surface to define a plurality of diverting orientations. While the articles are being conveyed by the carrying conveyor, the diverter engages and directs the articles at least partially laterally across the conveying surface toward the articles' destinations. The diverter pivots about an axis of rotation that is perpendicular to the conveying surface, and that axis of rotation can be moved laterally across the conveying surface. The axis of rotation of the diverter can also be moved to be proximate to or between the opposite ends of the diverter. The diverter can also translate across the conveying surface. The ability to translate, rotate and move the axis of rotation allows a single diverter to easily and efficiently divert from multiple upstream sources to multiple downstream destinations.

45 Claims, 5 Drawing Sheets

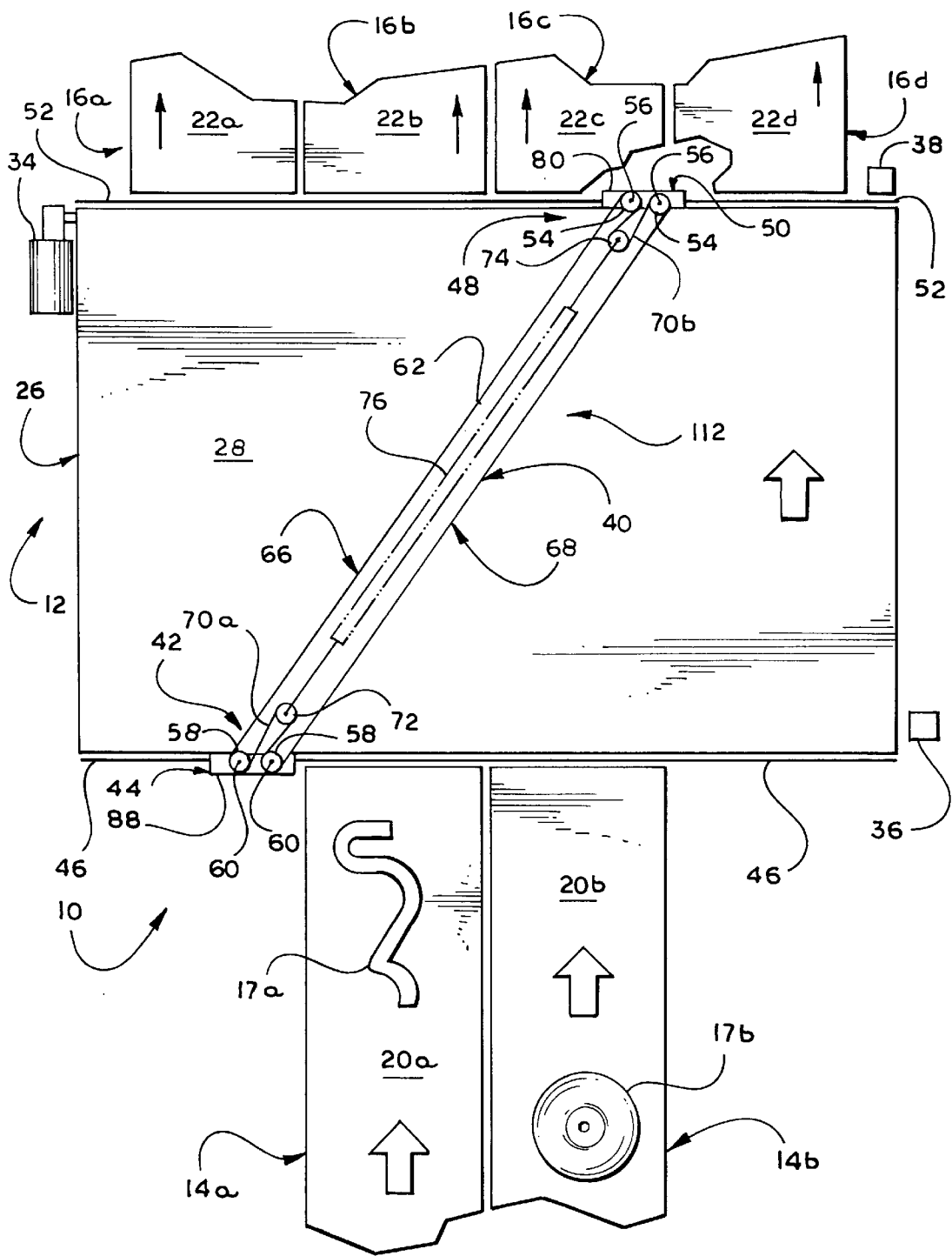
Fig_1

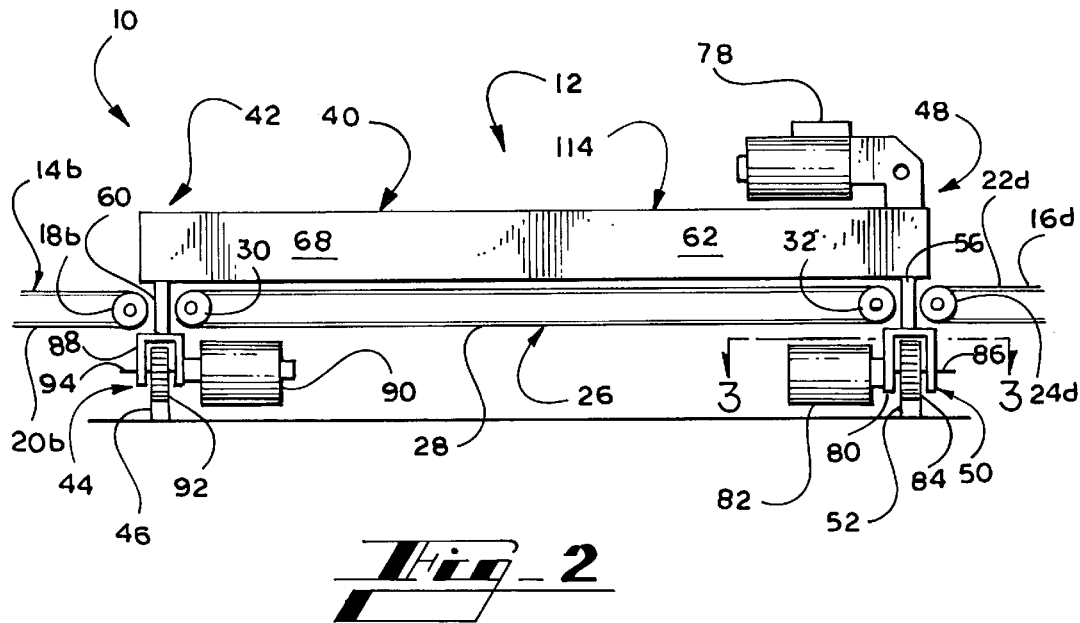
Fig_2
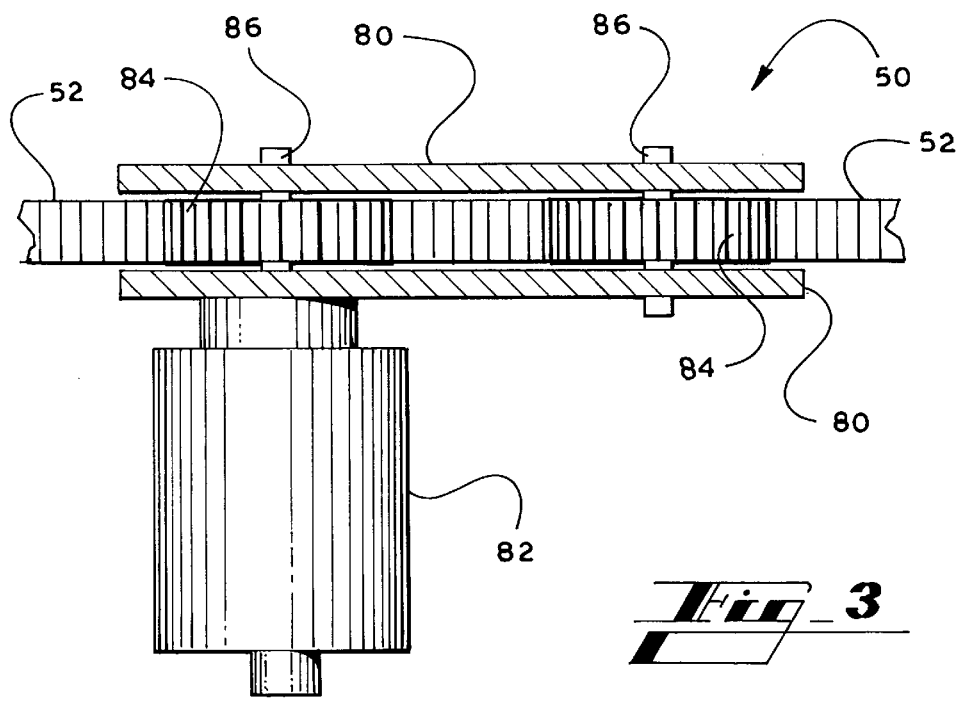
Fig_3

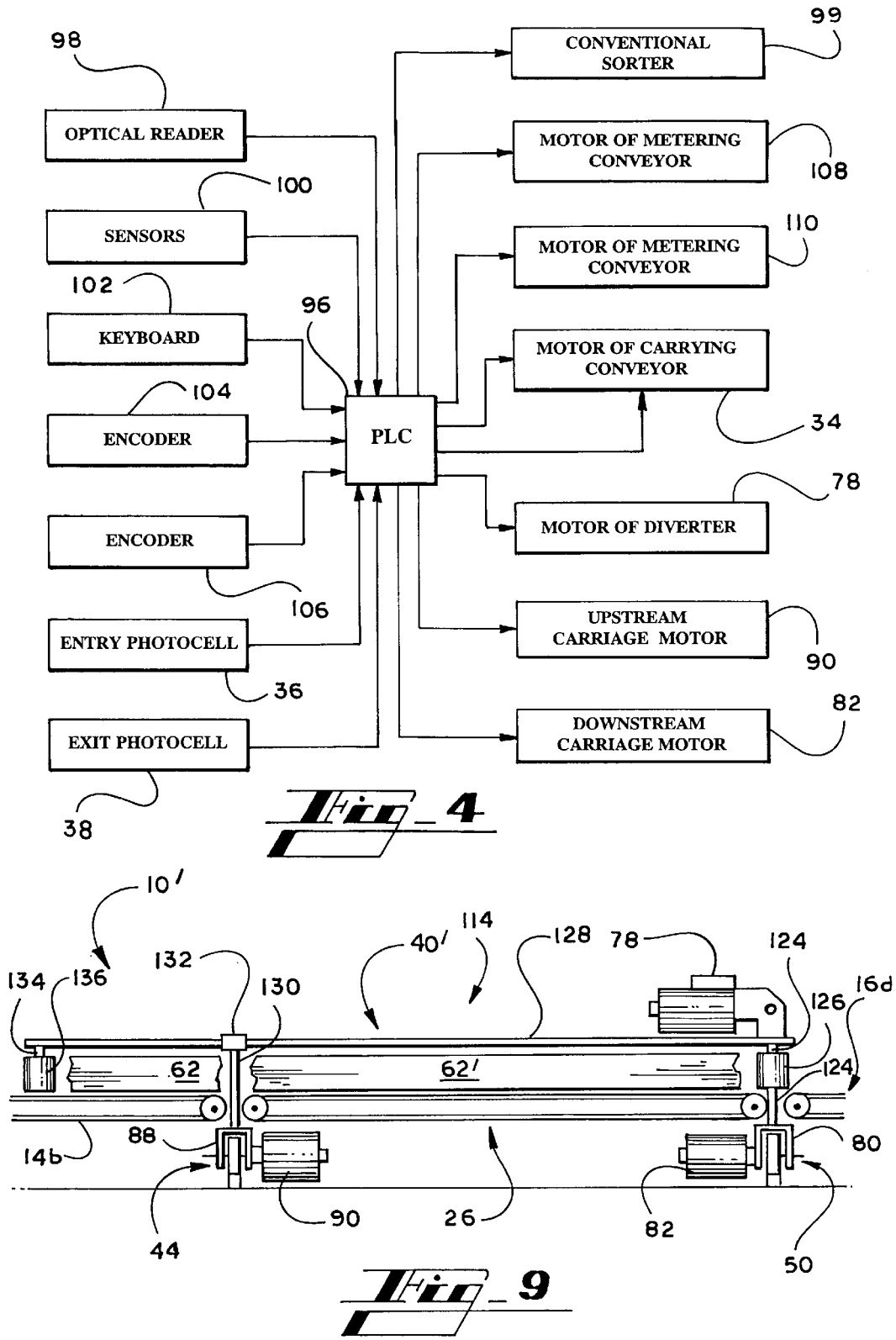

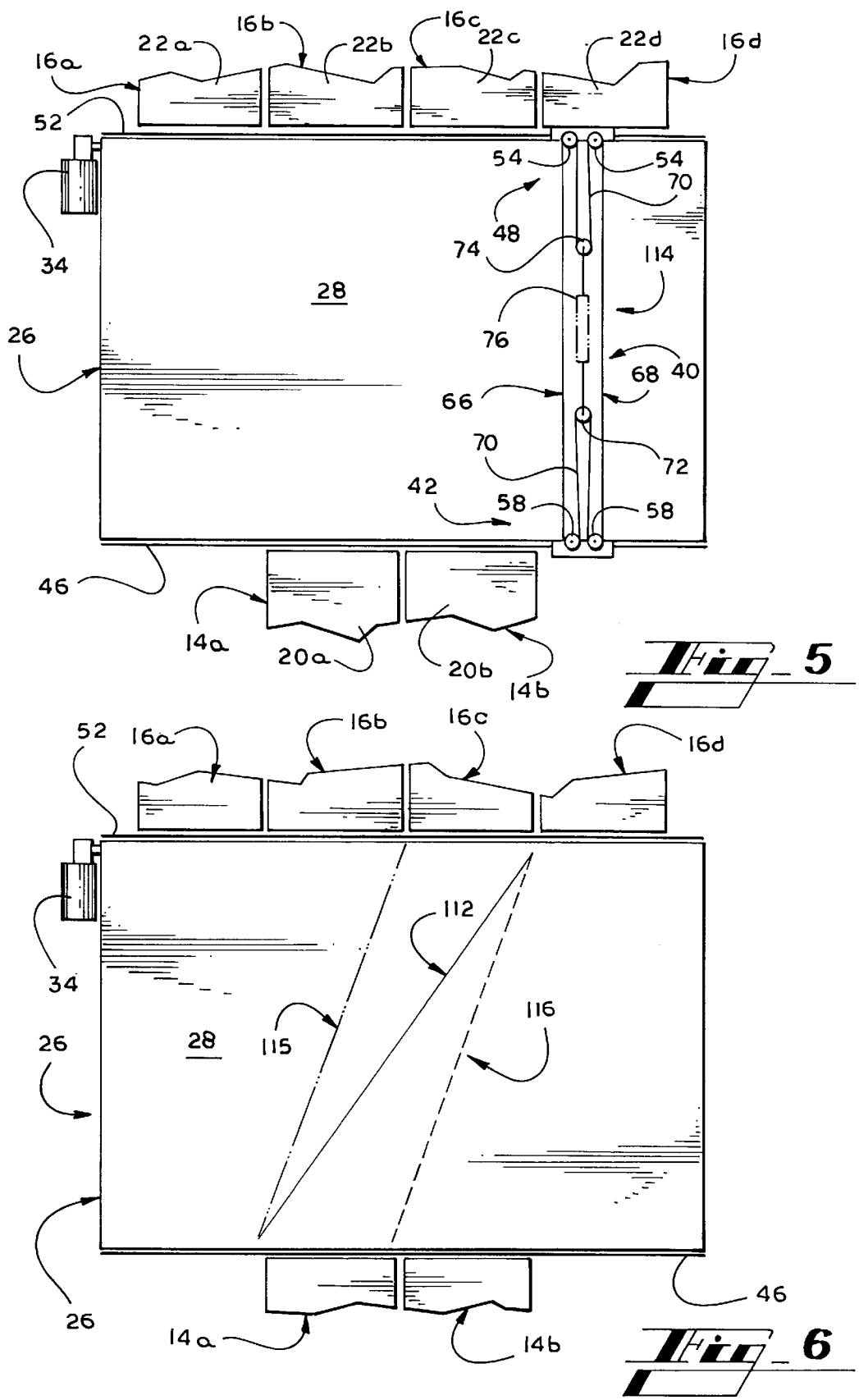

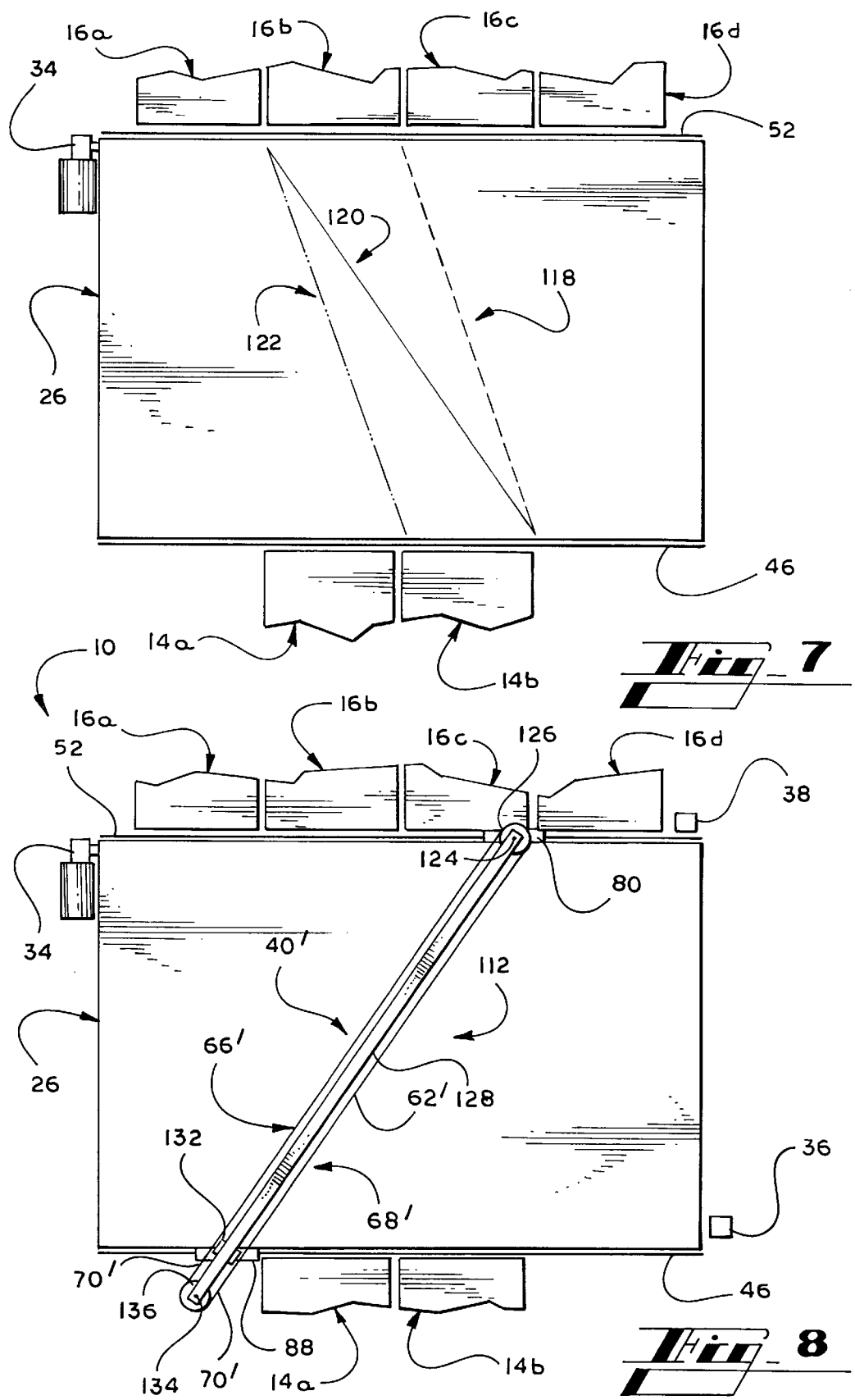

1

AUTOMATED DIVERTER CAPABLE OF SORTING BULKY ARTICLES

TECHNICAL FIELD

The present invention relates to conveyor sorters that sort articles, such as parcels, by diverting them from one conveyor to another conveyor, and more particularly relates to a conveyor diverter that moves across the surface of a conveyor to divert parcels passing on that conveyor.

BACKGROUND OF THE INVENTION

Package delivery companies pick up millions of packages daily from thousands of locations over a large geographical area and transport them to sorting facilities, primarily by truck and airplane, so they can be routed to a correspondingly large number of scattered destinations. To meet a rigorous schedule and provide accurate deliveries, a package delivery company must use automated transfer systems in the sorting facilities to match incoming packages with proper outgoing transport headed for the packages' destinations. Because deliveries are time sensitive, the sorting equipment must be very fast, yet provide gentle and accurate handling of packages.

Belt and roller conveyor systems have often been used in package sorting systems to move packages from incoming loading docks to outgoing transport. Sorting of packages traveling along a conveyor may be accomplished by diverting packages from the conveyor based on their destinations, or based on their size or another characteristic. U.S. Pat. Nos. 3,104,755; 4,711,357; 4,295,559; and 5,400,895 each disclose sorting assemblies that include a horizontal conveyor with a diverter that moves in close proximity to and across the surface of the conveyor to divert articles off of the conveyor toward their destinations. In some cases the diverter is simply an elongate paddle. In other cases the diverter is elongate, pivots across the surface of the conveyor, and includes an endless belt driven about pulleys whose axes extend perpendicularly from the conveyor.

Many sorter assemblies can directly receive incoming articles from only one or two upstream sources and can sort directly to only two or three downstream destinations. As a result, numerous sorters are often employed in a single conveyor system or at a single sorting facility, which increases the cost and complexity of the conveyor systems and sorting facilities.

Additionally, many of the sorter assemblies that are currently used by package delivery companies have difficulty sorting certain bulky articles, such as large car tail pipes, bags, tires, ladders, and other large or heavy articles. As a result, many of these types of articles have to be sorted manually. Manual sorting can be much more expensive and time consuming than sorting articles with automated sorters, especially when the articles are heavy.

Thus, there is a need in the art for a sorting assembly that possesses greater flexibility in the number of upstream sources from which it can directly receive articles and the number of downstream destinations to which it can directly sort articles, and that possess greater flexibility with respect to the articles, such as bulky articles, that it is capable of sorting.

SUMMARY OF THE INVENTION

The present invention seeks to provide an improved conveyor sorter that is capable of directly receiving articles from multiple upstream sources and directly sorting to multiple downstream destinations, and that can sort a wide variety of articles, including heavy, bulky articles.

In accordance with the invention, these objectives are accomplished by providing a diverter that is capable of pivoting between multiple upstream conveyors and multiple downstream conveyors to define multiple diverting orientations. The diverter pivots about an axis of rotation, and that axis of rotation is capable of being moved to maximize the number of different diverting orientations that the diverter can achieve.

In accordance with the exemplary embodiments of the present invention, the diverter moves across the conveying surface of a horizontally extending carrying conveyor that carries the articles being sorted. The carrying conveyor carries the articles in a longitudinal direction between an upstream end and a downstream end of the carrying conveyor. The diverter extends perpendicular to the conveying surface and moves across the conveying surface to define the plurality of diverting orientations. While the articles are being conveyed by the carrying conveyor, the diverter engages and directs the articles at least partially laterally across the conveying surface, when required, toward the articles' destinations.

The axis of rotation of the diverter is perpendicular to the conveying surface and can be moved laterally across the conveying surface. The axis of rotation of the diverter can also be moved to be proximate to, or between, each of the opposite ends of the diverter. The diverter can also translate across the conveying surface. The ability to both translate and rotate, and the ability to move the axis of rotation of the diverter, allows a single diverter to easily and efficiently divert from multiple upstream sources to multiple downstream destinations.

In accordance with the exemplary embodiments of the present invention, the mobility of the diverter is achieved by a pair of carriages. The upstream end of the diverter is mounted to an upstream carriage that translates along the upstream end of the conveying surface, and the downstream end of the diverter is mounted to a downstream carriage that translates along the downstream end of the conveying surface. The carriages move laterally, either in unison or independently, to move the opposite ends of the diverter and define the diverting orientations.

In accordance with another aspect of the present invention, the diverter is operative to frictionally drive articles in a direction defined from one end of the diverter to the opposite end of the diverter. The diverter preferably includes a continuous diverter belt that is driven and frictionally drives the articles. Thus, the diverter resembles a belted conveyor that has been turned onto one of its elongate sides. The diverter belt is reversible in direction and operates so that the side of the belt that faces upstream and engages articles is moving in a downstream direction.

In accordance with another aspect of the present invention, the diverter defines a first effective length while the diverter is in a first diverting orientation. The first effective length is the total distance along the diverter that an article travels while the diverter is contacting and directing the article to a first destination. The diverter defines a second effective length while the diverter is in a second diverting orientation. The second effective length is different from the first effective length and is the total distance along the diverter that an article travels while the diverter is contacting and directing the article to a second destination, which is different from the first destination and may be at a different distance from a common source.

In accordance with a first exemplary embodiment of the present invention, the effective length of the diverter is varied by varying the length of the diverter. As the length of the diverter increases, an accumulator releases excess portions of the diverter belt, and as the length of the diverter decreases, the accumulator accumulates excess portions of the diverter belt. In accordance with a second exemplary embodiment of the present invention, the effective length of the diverter is varied by maintaining the length of the diverter and moving portions of the diverter out of the path of the articles.

BRIEF DESCRIPTION OF THE DRAWINGS

FIG. 1 is a diagrammatic top view of a conveyor system incorporating a first exemplary sorting assembly in accordance with the first exemplary embodiment of the present invention.

FIG. 2 is a diagrammatic side view of the conveyor system of FIG. 1.

FIG. 3 is a diagrammatic cross-sectional view of a carriage assembly of the sorting assembly of FIG. 1, taken along line 3—3 of FIG. 2.

FIG. 4 is a block diagram of a control circuit for operating the conveyor system of FIG. 1.

FIG. 5 is a diagrammatic top view of the conveyor system of FIG. 1, illustrating the diverter in a second diverting orientation.

FIGS. 6 and 7 are diagrammatic top views of the conveyor system of FIG. 1, illustrating the diverter in multiple diverting orientations.

FIG. 8 is a diagrammatic top view of a conveyor system incorporating a second exemplary sorting assembly in accordance with the second exemplary embodiment of the present invention.

FIG. 9 is a diagrammatic side view of the conveyor system of FIG. 8.

DETAILED DESCRIPTION OF PREFERRED EMBODIMENTS

Referring now in more detail to the drawings, in which like numerals refer to like parts throughout the several views, FIG. 1 is a diagrammatic top view of a conveyor system 10 incorporating a sorting assembly 12, in accordance with the first exemplary embodiment of the present invention. The sorting assembly 12 is positioned between a pair of upstream metering conveyors 14a and 14b and multiple downstream outbound conveyors 16a, 16b, 16c and 16d. Each of the metering conveyors 14 and outbound conveyors 16 are preferably conventional belted conveyors; although, in accordance with the exemplary embodiments of the present invention the metering conveyors cooperate with the sorting assembly 12 in an inventive manner.

The sorting assembly 12 receives articles, such as articles 17a and 17b, from the upper runs (i.e., transporting surfaces) of metering conveyors 14 in a controlled fashion, and sorts the articles to the outbound conveyors 16. The upper run (i.e., transporting surface) of each of the outbound conveyors 16 directs articles 17 to a different destination. The sorting assembly 12 includes a variable speed carrying conveyor 26 and a belted diverter 40 that moves across the upper surface (i.e., transporting surface) of the carrying conveyor. The diverter 40 diverts the articles 17 toward their respective outbound conveyors 16.

The articles 17a and 17b can be a wide variety of articles, such as parcels, large car tail pipes, bags, tires, ladders, and other bulky or heavy articles. Those skilled in the art will appreciate that in FIG. 1, and other drawings of this disclosure, portions of the conveyor system 10 are cut away or not shown. For example, in FIG. 1 portions of the metering conveyors 14 and the outbound conveyors 16 are cut away.

Referring to FIG. 2, which is a diagrammatic side view of the conveyor system 10, the metering conveyor 14b is illustrated in greater detail. The metering conveyor 14b is representative of the metering conveyor 14a. Referring to FIGS. 1 and 2, each metering conveyor 14 includes an endless belt 20 that extends around a downstream roller 18 and an upstream roller (not shown). One of the rollers of each metering conveyor 14 is driven by a variable speed motor so that the speed of the top runs of the belts 20 of the metering conveyors can be varied. In accordance with the exemplary embodiments of the present invention, the speeds of the metering conveyors 14 are controlled so that only one article 17 at a time is upon the carrying conveyor 26. Alternatively the speeds of the metering conveyors 14 are constant, and articles 17 are placed on the metering conveyors so that the spacing between the articles is sufficient to ensure that only one article 17 at a time is upon the carrying conveyor 26.

The outbound conveyor 16d is representative of each of the other outbound conveyors 16. Each outbound conveyor 16 includes a continuous belt 22 extending around an upstream roller 24 and a downstream roller (not shown). One of the rollers of each outbound conveyor 16 is driven by a motor so that the upper runs of the belts 22 of the outbound conveyors move away from the sorting assembly 12.

In accordance with the exemplary embodiments of the present invention, the carrying conveyor 26 of the sorting assembly 12 extends generally in a common horizontal plane with the metering conveyors 14 and the outbound conveyors 16. Therefore, the metering conveyors 14, outbound conveyors 16 and carrying conveyor 26 each carry articles 17 in a common horizontal conveyance plane. The carrying conveyor 26 includes a carrying belt 28 that extends around an upstream roller 30 and a downstream roller 32. A variable speed gear motor 34 drives the downstream roller 32 so that the top run of the carrying belt 28 travels from the metering conveyors 14 toward the outbound conveyors 16. An entry photocell 36 observes the upstream end of the carrying conveyor 26 and an exit photocell 38 observes the downstream end of the carrying conveyor to provide information used to determine whether an article 17 is upon the carrying conveyor 26. In accordance with the exemplary embodiments of the present invention, the carrying conveyor 26 is about twelve feet wide and twenty feet long. The carrying belt 28 runs continuously and between approximately one hundred and three hundred feet per minute.

As mentioned, the diverter 40 of the sorting assembly 12 moves across the surface of the upper run of the carrying conveyor 26. The diverter 40 moves between numerous diverting orientations to divert articles 17 on the carrying conveyor 26 to the outbound conveyors 16. The diverter 40 includes an upstream end 42 that is connected to and moved by an upstream carriage assembly 44 along an upstream track 46 mounted between the metering conveyors 20 and the carrying conveyor 28. The diverter 40 also includes a downstream end 48 that is connected to and moved by a downstream carriage assembly 50 along a downstream track 52 mounted between the carrying conveyor 28 and the outbound conveyors 16. The carriage assemblies 44 and 50 function such that the upstream end 42 and the downstream end 48 can be moved in unison or independently of each other. The diverter 40 can assume any orientation across the carrying conveyor 26 that can be achieved with the carriage assemblies 44 and 50 upon their respective tracks 46 and 52.

The downstream carriage 50 includes a downstream chassis 80 that is depicted in the form of an elongate, inverted U-shaped channel member. A pair of downstream shafts 56 are connected to the top of the downstream chassis 80 and extend upward through a narrow space defined between the downstream end of the carrying conveyor 26 and the upstream ends of the outbound conveyors 16. A pair of downstream rollers 54 are mounted to the downstream shafts 56, are above the horizontal conveyance plane, and rotate about vertical axes.

The upstream carriage assembly 44 includes an upstream chassis 88 that is depicted in the form of an elongate, inverted U-shaped channel member. A pair of upstream shafts 60 extend upward from the top surface of the upstream chassis 88 through a narrow space defined between the downstream ends of the metering conveyors 14 and the upstream end of the carrying conveyor 26. A pair of upstream rollers 58 are mounted to the upstream shafts 60, and are above the horizontal conveyance plane, and rotate about vertical axes.

A continuous and vertically extending diverter belt 62 extends around and between the upstream rollers 58 and the downstream rollers 54. The diverter belt 62 is driven by one of the downstream rollers 54 that is driven by a variable speed gear motor 78. The gear motor 78 is connected to the downstream chassis 80 by a flange, or the like. The diverter belt 62 extends perpendicularly from proximate to the upper surface of the carrying belt 28 and engages articles 17 being carried by the carrying belt 28 to direct and frictionally drive those articles at least partially laterally across the carrying conveyor 26. The motor 78 is reversible and is automatically reversed to alternately operate the diverter belt 62 clockwise and counterclockwise, as will be discussed in greater detail below.

The diverter belt 62 defines a belt portion 66 that, from the perspective of FIG. 1, extends from the left upstream roller 58 to the left downstream roller 54. In accordance with the first exemplary embodiment, when the diverter 40 is acting upon an article 17 that is to the left of the diverter, that article 17 travels along the entire length of the belt portion 66. The diverter belt 62 also defines a belt portion 68 that, from the perspective of FIG. 1, extends from the right upstream roller 58 to the right downstream roller 54. In accordance with the first exemplary embodiment, when the diverter 40 is acting upon an article 17 that is to the right of the diverter, that article 17 travels along the entire length of the belt portion 68.

The diverter belt 62 also defines excess belt portions 70a and 70b that extend around a vertically extending upstream accumulator roller 72 and a vertically extending downstream accumulator roller 74, respectively. The excess belt portion 70a extends between the upstream rollers 58 and around the upstream accumulator roller 72. The excess belt portion 70b extends between the downstream rollers 54 and around the downstream accumulator roller 74. The accumulator rollers 72 and 74 are biased toward one another by a biasing spring 76, or the like, which keeps the diverter belt 62 taut while the length of the diverter 40 varies.

FIG. 3 is a diagrammatic cross-sectional view of the downstream carriage assembly 50 taken along line 3—3 of FIG. 2. The downstream carriage assembly 50 is representative of the upstream carriage assembly 44. Referring to FIGS. 2 and 3, the downstream carriage assembly 50 includes a downstream carriage motor 82 that is mounted to one side of the downstream chassis 80 and drives at least one of a pair of round, toothed gears 84. The downstream carriage motor 82 is preferably a variable speed reversible servomotor. The gears 84 are connected to the downstream chassis 80 by axles 86. The gears 84 carry the downstream chassis 80 and travel upon and along the downstream track 52. The downstream track 52 is preferably a toothed rack that meshes with the gears 84 so that rotation of the gears 84 causes the downstream chassis 80 to move along the downstream track in a controlled manner.

Referring to FIG. 2, the upstream carriage assembly 44 similarly includes an upstream carriage motor 90 mounted to a side of the upstream chassis 88. The upstream carriage motor 90 is preferably a variable speed reversible servomotor. The upstream carriage motor 90 drives at least one of a pair of round, toothed gears 92 that are connected to the upstream chassis 88 by axles 94. The gears 92 carry the upstream chassis 88 and travel upon and along the upstream track 46. The upstream track 46 is preferably a toothed rack that meshes with the gears 92 so that rotation of the gears 92 causes the upstream chassis 88 to move along the upstream track in a controlled manner.

Referring to the block diagram of FIG. 4, the operation of the conveyor system 10 is automated through the use of a digital controller, such as a programmable logic controller 96 (PLC), or a general purpose computer, typically having an appropriate microprocessor. The PLC 96 may receive input signals from an optical reader 98 that reads bar code or two-dimensional symbols (such as MaxiCode symbols) on labels attached to the articles 17. Such a symbol may contain address information which allows the PLC 96 to determine, in a well known manner, which outbound conveyor 16 will carry the articles 17 toward their final destination. The optical reader 98 can be positioned above a conventional feed conveyor that is upstream from the metering conveyors 14.

A conventional sorter 99 that is proximate to the downstream end of the feed conveyor and under the control of the PLC diverts articles 17 alternately to the metering conveyor 14a and the metering 14b. The PLC 96 functions, in a well known manner, to retain information about which articles 17 are deposited onto which of the metering conveyors 14a and 14b, and the time of those deposits. The PLC 96 may also receive information about an article 17 from sensors 100, such as a scale or device for measuring dimensions of the article 17. The sensors 100 can be associated in a known manner with the conventional feed conveyor that is upstream of the metering conveyors 14. Information about the articles 17 can also or alternatively be entered manually at a keyboard 102 that the PLC 96, or a substituted computer, receives information from.

A rotary belt encoder 104 is associated with the belt 20a of the metering conveyor 14a in a conventional manner to measure the displacement of the belt 20a. Similarly, a rotary belt encoder 106 is associated with the belt 20b of the metering conveyor 14b in a conventional manner to measure the displacement of the belt 20b. The output of the encoders 104 and 106 is input to the PLC 96. The PLC also receives output signals from the entry photocell 36 and the exit photocell 38 in a manner that allows the PLC to determine when the carrying conveyor 26 is occupied by an article 17. The PLC 96 processes the above-discussed information and signals and responsively generates output signals to control operation of the conveyor system 10.

The PLC 96 sends control signals to: a variable speed gear motor 108 that drives the metering conveyor 14a; a variable speed gear motor 110 that drives the metering conveyor 14b; the variable speed gear motor 34 that drives the carrying belt 28 of the carrying conveyor 26; the variable speed gear motor 78 that drives the diverter belt 62; the upstream carriage motor 90; and the downstream carriage motor 82. Those control signals generated by the PLC 96 cause the conveyor system 10 to operate in the manner described below.

Referring to FIGS. 1–4, operation of the conveyor system 10 begins when articles 17 are carried past the optical reader 98 by the conventional feed conveyor that is upstream of the metering conveyors 14a and 14b. The optical reader 98, or other input devices, function in a conventional manner to acquire destination data about each article 17. Any bar codes or other symbols on the articles 17 are detected and decoded. Destination information may be embedded in a dense code, or may be stored in a database location the address of which is contained in a bar code. Furthermore, textual address information on the label can be analyzed using conventional OCR techniques. The articles 17 can also monitored while on the feed conveyor by the sensors 100 to determine the weight and shape of the articles 17.

The articles are preferably carried past the optical reader 98 and the sensors 100 in a sequential fashion, and then the conventional sorter 99 sequentially diverts the articles 17 onto the metering conveyors 14. The PLC 96 controls and monitors the actions of the conventional sorter 99 to track the articles 17 as they travel onto the metering conveyors 14. Additionally, the encoders 104 and 106 monitor the movement of the metering conveyors 14 so that the PLC 96 can track the exact location of each of the articles 17 as they travel on the metering conveyors.

It should be understood that the present invention can use a variety of feed mechanisms and other equipment to get the articles 17 properly placed upon the metering conveyors 14, or the articles 17 can be placed manually on the metering conveyor 14 and necessary data about the articles 17 can be entered into the PLC 96, or a computer functioning in place of the PLC, by way of the keyboard 102. However, it is preferable for the automation of the conveyor system 10 to be maximized by associating the optical reader 98 and the sensors 100 with a feed conveyor, and having a conventional sorter 99 that automatically diverts the articles 17 onto the metering conveyors 14 in a controlled and monitored fashion.

The PLC 96 monitors the rotary encoder devices 104 and 106 and adjusts the speed of the motors 108 and 110 that drive the metering conveyors 14 so that a single article 17 is upon the carrying belt 28 at any given time. By monitoring and controlling the movement of the articles 17 on the metering conveyors 14, and by monitoring the photocells 36 and 38, the PLC causes there to be a temporary delay between the time that an article 17 passes off of the carrying conveyor 26 and the next article passes onto the carrying conveyor. During that period of time, the PLC 96 functions to cause the diverter 40 to be moved to the diverting orientation required to properly divert the next article 17 to be sorted by the sorting assembly 12 toward its destination. If the diverter 40 needs to be moved, the PLC 96 causes the downstream carriage motor 82 and the upstream carriage motor 90 to operate in a manner that moves the diverter into the proper diverting orientation.

When articles 17 sequentially processed by the sorting assembly 12 are directed to the same outbound conveyor 16, the PLC 96 controls the operation of the conveyor system 10 to minimize the amount of time between the exiting of the first article 17 from the carrying conveyor 26 and the entry of the second article upon the carrying conveyor. Also, if the sensors 100 indicate that the first and second articles are light and can both be handled by the sorting assembly 12 at the same time, those articles will be placed upon the carrying conveyor 26 in close succession so that there are two articles concurrently upon the carrying conveyor.

Depending on the shape and weight of an article 17 being carried by the carrying belt 28, as determined by the sensors 100, the PLC 96 will adjust the speed of the motor 34 that drives the carrying belt 28 and the motor 78 that drives the diverter belt 62 to optimize the functioning of the sorting assembly 12 and prevent damage to the sorting assembly 12 and the article 17. For example, it may be desirable to slow the carrying belt 28 considerably before a very heavy article 17 is deposited onto the carrying conveyor 26 so that the article can be more easily carried and diverted by the sorting assembly 12. Adjustments are concurrently made to the speed of the motor 34 and the speed of the motor 78 so that the carrying belt 28 operates at approximately the same speed as the diverter belt 62.

The PLC 96 further controls operation of the motor 78 that drives the diverter belt 62 so that, from the view illustrated in FIG. 1, the diverter belt 62 operates clockwise when the belt portion 66 is engaging and moving an article 17, and counterclockwise when the belt portion 68 is engaging and moving an article. As discussed in greater detail below, in accordance with the first exemplary embodiment of the present invention, only one of the belt portions 66 or 68 engages an article 17 at a time.

As mentioned above, in accordance with one mode of operation, as soon as an article 17 has been discharged from the carrying belt 28, the PLC 96 determines which article 17 will next be deposited on the carrying belt 28 from one of the metering conveyors 14. The PLC 96 recalls the destination data about the article 17 that is to be deposited on the carrying belt 28 and moves the diverter 40 to the diverting orientation that will result in the article 17 being directed to the single outbound conveyor 16 that corresponds to the destination data. The diverter 40 is moved into its proper diverting orientation prior to the article 17 moving onto the carrying belt 28.

The PLC 96 controls movement of the diverter 40 by controlling operation of the upstream carriage motor 90 and the downstream carriage motor 82. The carriage motors 82 and 90 can be operated independently of each other, at different speeds, or in unison. From the perspective of FIG. 1, operation of the upstream carriage motor 90 moves the upstream end 42 of the diverter 40 laterally between right and left sides of the carrying conveyor 26. Operation of the downstream carriage motor 82 moves the downstream end 48 of the diverter 40 laterally between right and left sides of the carrying conveyor 26.

The PLC 96 controls operation of the carriage motors 82 and 90 to orient the diverter 40 in a plurality of diverting orientations. For example, a first diverting orientation 112 is depicted in FIG. 1, and a second diverting orientation 114 is depicted in FIG. 5. Those skilled in the art will appreciate that as the diverter 40 moves between diverting orientations, the length of the diverter 40 varies. For example, the length of the diverter 40 is approximately fifty percent greater in the diverting orientation 112 illustrated FIG. 1 than it is in the diverting orientation 114 illustrated in FIG. 5. As the length of the diverter 40 decreases, the downstream accumulator roller 74 and the upstream accumulator roller 72 move toward one another in response to the biasing of the spring 76. This increases the amount of the excess belt portions 70 and decreases the length of the belt portions 66 and 68, and keeps the belt portions taut so that they can optimally divert articles 17. As the length of the diverter 40 increases, the spring 76 expands to allow the upstream accumulator roller 72 and the downstream accumulator roller 74 to move away from one another so that portions of the excess belt portions 70 are released and become belt portions 66 and 68.

FIGS. 6 and 7 are diagrammatic top views of the conveyor system 10 that diagrammatically illustrate a plurality of the diverting orientations of the diverter 40. The diverting orientations illustrated in FIGS. 6 and 7 are represented by a plurality of straight lines, some of which are broken, that extend between the upstream and the downstream ends of the carrying conveyor 26. Each of those lines is intended to approximately illustrate the placement of the elongate axis of the diverter 40 in a diverting orientation. For example, the first diverting orientation 112 is illustrated in each of the FIGS. 1 and 6. While the diverter 40 is in the first diverting orientation 112, the upstream end 42 of the diverter 40 is proximate to the left side of the metering conveyor 14a, and the downstream end 48 of the diverter is proximate to the left side of the outbound conveyor 16d. While the diverter 40 is in the first diverting orientation 112, an article 17 is directed onto the carrying conveyor 26 from the metering conveyor 14a, and that article is directed, under the combined influence of the carrying conveyor and the diverter, to the outbound conveyor 16d.

Referring to FIGS. 1, 2, 4 and 6, in a third diverting orientation 115, which is achieved through PLC 96 controlled operation of the carriage motors 82 and 90, the upstream end 42 of the diverter 40 is proximate to the left side of the metering conveyor 14a, and the downstream end 48 of the diverter is proximate to the left side of the outbound conveyor 16c. While the diverter 40 is in the third diverting orientation 115, an article 17 is deposited onto the carrying conveyor 26 from the metering conveyor 14a, and that article is directed, under the combined influence of the carrying conveyor and the diverter, to the outbound conveyor 16c.

In a fourth diverting orientation 116, that is also achieved through PLC 96 controlled operation of the carriage motors 82 and 90, the upstream end 42 of the diverter 40 is just left of the metering conveyor 14b, and the downstream end 48 of the diverter is just left of the outbound conveyor 16d. While the diverter 40 is in the fourth diverting orientation 116, an article 17 is deposited onto the carrying conveyor 26 from the metering conveyor 14b, and that article is directed, under the combined influence of the carrying conveyor and the diverter, to the outbound conveyor 16d.

In each of the first, third and fourth diverting orientations 112, 115 and 116, respectively, the article 17 being sorted is in contact with the belt portion 68 (FIG. 1) along substantially the entire length of the diverter 40, and the diverter belt 62 rotates counterclockwise when viewed from above. That is, the belt portion 68 is active, and the belt portion 66 is inactive, in each of the first, third and fourth diverting orientations 112, 115 and 116. So, while the carrying belt 28 of the carrying conveyor 26 functions in a manner that seeks to carry an article 17 in a longitudinal direction from the upstream end of the carrying conveyor to the downstream end of the carrying conveyor, the diverter 40 functions in the diverting orientations 112, 115 and 116 to move the an article at least partially laterally across the carrying conveyor 26.

Referring to FIGS. 1, 2, 4 and 7, PLC 96 controlled operation of the carriage motors 82 and 90 also moves the diverter 40 to a fifth diverting orientation 118. In the fifth diverting orientation 118, the upstream end 42 of the diverter 40 is just to the right of the metering conveyor 14b, and the downstream end 48 of the diverter is just to the right of the outbound conveyor 16b. In the fifth diverting orientation 118, an article 17 is deposited on the carrying conveyor 26 from the metering conveyor 14b, and that article is directed, under the combined influence of the carrying conveyor and the diverter 40, to the outbound conveyor 16b.

The carriage motors 82 and 90 are also operated, under control of the PLC 96, to move the diverter 40 to a sixth diverting orientation 120. In the sixth diverting orientation 120, the upstream end 42 of the diverter 40 is just to the right of the metering conveyor 14b, and the downstream end 48 of the diverter is just to the right of the outbound conveyor 16a. In the sixth diverting orientation 120, an article 17 is deposited onto the carrying conveyor 26 from the metering conveyor 14b, and that article is directed, under the combined influence of the carrying conveyor and the diverter 40, to the outbound conveyor 16a.

The carriage motors 82 and 90 are also operated, under control of the PLC 96, to move the diverter 40 to a seventh diverting orientation 122. In the seventh diverting orientation 122, the upstream end 42 of the diverter 40 is just to the right of the metering conveyor 14a, and the downstream end 48 of the diverter is just to the right of the outbound conveyor 16a. In the sixth diverting orientation, an article 17 is deposited onto the carrying conveyor 26 from the metering conveyor 14a, and that article is directed, under the combined influence of the carrying conveyor and the diverter 40, to the outbound conveyor 16a.

In each of the fifth, sixth and seventh diverting orientations 118, 120 and 122, respectively, the article 17 being sorted is in contact with the belt portion 66 (FIG. 1) along substantially the entire length of the diverter 40. Also, while the diverter 40 is in the diverting orientations 118, 120 and 122, the diverter belt 62 is rotated clockwise when viewed from above. So, the belt portion 66 is active, and the belt portion 68 is inactive, in each of the fifth, sixth and seventh diverting orientations 118, 120 and 122.

Those skilled in the art will appreciate that each of the diverting orientations diagrammatically illustrated in FIGS. 6 and 7 function to move articles 17 at least partially laterally across the carrying conveyor 26. In contrast, while the diverter 40 is in the second diverting orientation 114 depicted in FIG. 5, the diverter 40 does not engage articles 17 being carried by the carrying conveyor 26 and the diverter belt 62 is stationary. The metering conveyor 14a is aligned with the outbound conveyor 16b so that any article 17 deposited onto the carrying conveyor 26 from the metering conveyor 14a while the diverter 40 is in the second diverting orientation 114 will be carried solely longitudinally across the carrying conveyor and deposited onto the outbound conveyor 16b. Similarly, the metering conveyor 14b is aligned with the outbound conveyor 16c so that any article 17 deposited onto the carrying conveyor 26 from the metering conveyor 14b while the diverter 40 is in the second diverting orientation 114 will be carried solely longitudinally across the carrying conveyor 26 and deposited upon the outbound conveyor 16c.

Those skilled in the art will appreciate that an extra wide article may extend across both of the metering conveyors 14. In such a situation, both of the metering conveyors would be operated in unison, and the diverter 40 could be placed in the third diverting orientation 115 to direct the extra wide article to the outbound conveyors 16c and 16d. The diverter 40 could alternatively be placed in the fifth diverting orientation 118 to direct the extra wide article to the outbound conveyors 16a and 16b. The diverter 40 could alternatively be placed in the second diverting orientation 114 so that the extra wide article is passed to the outbound conveyors 16b and 16c.

Those skilled in the art will appreciate that the diverter 40 pivots about a vertical axis and moves laterally across the carrying conveyor 26 such that the vertical axis moves laterally across the carrying conveyor. For example, when the diverter 40 moves from the second diverting orientation 114 (FIG. 5) to the seventh diverting orientation 122 (FIG. 7), the downstream end 48 of the diverter 40 moves relative to the upstream end 42 of the diverter 40 so that a vertical axis of rotation is defined at the upstream end of the diverter, and the upstream end 42 of the diverter 40 is contemporaneously moved laterally so that the vertical axis of rotation of the diverter 40 is moved laterally relative to the carrying conveyor 26.

As another example of the mobility of the diverter 40, the vertical axis of rotation of the diverter 40 is at a point half way between the upstream end 42 and the downstream end 48 of the diverter when the diverter moves from the fourth diverting orientation 116 (FIG. 6) to the fifth diverting orientation 118 (FIG. 7). A similarly defined and arranged vertical axis of rotation moves laterally when the diverter 40 moves from the fifth diverting orientation 118 to the third diverting orientation 115 (FIG. 6). Those skilled in the art will also appreciate that the diverter 40 translates. For example, the diverter translates when moving from the third diverting orientation 115 to the fourth diverting orientation 116.

From the foregoing, those skilled in the art will appreciate that the vertical axis of rotation of the diverter 40 can be moved between the upstream end 42 and the downstream end 48 of the diverter, and can be moved laterally relative to the carrying conveyor 26 so that the diverter 40 can move between the plurality of diverting orientations. This allows the sorter assembly 12 to quickly and efficiently sort from a plurality of upstream sources to a plurality of downstream destinations. While only two metering conveyors 14 and only four outbound conveyors 16 are illustrated in the drawings of this disclosure, sorter assemblies of the present invention can directly receive articles 17 from a greater or lesser number of metering conveyors, and can directly sort the articles to a greater or lesser number of outbound conveyors.

FIGS. 8 and 9 are top and side diagrammatic views, respectively, of a conveyor system 10' in accordance with the second exemplary embodiment of the present invention. The conveyor system 10' is identical to the conveyor system 10 of this first exemplary embodiment except for the variations that are expressly noted or would be appreciated by those skilled in the art. The main difference between the conveyor system 10' of the second exemplary embodiment and the conveyor system 10 of the first exemplary embodiment is that an alternate diverter 40' is employed in the conveyor system 10'. The alternate diverter 40' functions similarly to the diverter 40 of the first exemplary embodiment, except that the total length of the alternate diverter 40' does not change.

In accordance with the second exemplary embodiment, an axle 124 extends upward from the downstream chassis 80 through the space defined between the carrying conveyor 26 and the outbound conveyors 16. A vertically extending downstream roller 126 is mounted to the axle 124 for rotation about a vertical axis. An elongate bar 128 is also mounted to the axle 124 for pivoting about the vertical axis. The variable speed and reversible gear motor 78 rotates the downstream roller 126 to drive the diverter belt 62'. the motor 78 is mounted to the elongate bar 128 or the downstream chassis 80 by a flange.

A supporting shaft 130 extends upward from the upstream chassis 88 between the carrying conveyor 26 and the metering conveyors 14. A holder 132, such as a U-shaped bracket, is mounted to the upper end of the supporting shaft 130 for rotation about a vertical axis. The holder 132 movably holds the elongate bar 128 so that the elongate bar can reciprocate relative to the holder and the upstream edge of the carrying conveyor 26 as the diverter 40' moves between the plurality of diverting orientations 112, 114, 115, 116, 118, 120 and 122 (FIGS. 1, 2, and 5–9). An axle 134 extends downward from the upstream end of the elongate bar 128 and an upstream roller 136 is mounted to that axle for rotation about a vertical axis. The diverter belt 62' extends around the rollers 126 and 136.

Portions 66' and 68' of the diverter belt 62', which are those portions of the diverter belt that contact an article 17 while the diverter 40 is moving the article at least partially laterally across the carrying conveyor 26, extend from the downstream roller 126 to proximate the holder 132 and the upstream end of the carrying conveyor. When the diverter 40' moves between the plurality of diverting orientations depicted in FIGS. 6 and 7, it is the holder 132 that is just to the left or the right of the metering conveyor 14 that is depositing an article 17 onto the carrying conveyor 26. The upstream end of the diverter 40' may protrude farther upstream and to the side of the metering conveyors 14, as depicted in FIG. 8. That portion of the diverter belt 62' protruding upstream of the carrying conveyor 26 can be characterized as an excess belt portion 70'. In accordance with the second exemplary embodiment, the excess belt portion 70' does not contact the articles 17. Those skilled in the art will appreciate that the surface of the carrying conveyor 26, or portions thereof, can be characterized as a zone from which the upstream end of the diverter 40' protrudes.

In accordance with the exemplary embodiments of the present invention, an article 17 being sorted in a manner that requires the article to move at least partially laterally across the carrying conveyor 26 is engaged by an active portion of the belt 62 of the diverter 40 or 40' as soon as the article is deposited upon the carrying conveyor 26, and that active portion continues to engage the article being sorted until the article is discharged form the carrying conveyor 26. Also, the diverters 40 and 40' are preferably in the desired diverting orientation prior to engaging an article 17. This causes the diverters 40 and 40' to gently and efficiently engage the articles 17.

In accordance with exemplary alternative embodiments of the present invention, the diverters 40 and 40' move laterally while engaging and directing an article 17, and articles are engaged by the diverters only after they have been carried at least some distance longitudinally by the carrying conveyor 26. In accordance with select alternative embodiments of the present invention (not shown), the diverters do not include the diverter belt 62 or 62'. In those alternative embodiments the diverters are in the form of another type of transporting device for receiving and transporting articles 17, such as elongate paddles that are oriented as described above to direct the articles 17. Diverters in the form of elongate paddles do not frictionally drive the articles 17. The diverters 40 and 40' can also be replaced with another type of transporting device having a transporting surface for receiving and frictionally driving articles 17, such as a powered roller conveyor turned onto its side.

Those skilled in the art will appreciate that each of the metering conveyors 14, outbound conveyors 16, and the carrying conveyor 26 can be individually replaced with another type of transporting device having a transporting surface for receiving and frictionally driving articles 17, such as a powered roller conveyor. As an additional example, one or all of the metering conveyors 14, outbound conveyors 16, and the carrying conveyor 26 can be individually replaced with another type of transporting device having a transporting surface for receiving and transporting articles, such as an inclined chute, or the like.

From the foregoing, those skilled in the art will appreciate that a conveyor system embodying the present invention is capable of utilizing a single sorting assembly to divert articles from numerous upstream conveyors that are contiguous to the upstream end of the sorting assembly to numerous downstream conveyors that are contiguous to the downstream end of the sorting assembly. Destination information for the articles may be viewed by an optical reader and relayed to a programmed logic controller which in turn causes the diverter to be configured in one of a plurality of diverting orientations to properly direct articles toward their destinations. It will also be appreciated that a conveyor system embodying the present invention can readily sort articles having a wide range of shapes and weights.

From the foregoing, those skilled in the art will also appreciate that the scope of the present invention includes an article transferring apparatus having one or a plurality of upstream transporting devices, a plurality of downstream transporting devices, and an intermediate transporting device capable of diverting articles from the upstream transporting devices to the downstream transporting devices. The upstream transporting devices can include a first transporting device above or beside a second transporting device, and the downstream transporting devices can include a third transporting device above or beside a fourth transporting device. The intermediate transporting device includes an upstream end and a downstream end, and is positioned at least partially between the upstream transporting devices and the downstream transporting devices.

The intermediate transporting device is operative for moving the upstream end between the first transporting device and the second transporting device, and further operative for moving the downstream end between the third transporting device and the fourth transporting device. Therefore, the intermediate transporting device is operative for defining a first diverting orientation in which the upstream end is proximate to the first transporting device and the downstream end is proximate to the fourth transporting device so that the intermediate transporting device is capable of diverting articles from the first transporting device to the fourth transporting device. The intermediate transporting device is therefore also operative for defining a second diverting orientation in which the upstream end is proximate to the second transporting device and the downstream end is proximate to the third transporting device so that the intermediate transporting device is capable of diverting articles from the second transporting device to the third transporting device.

When the first and second transporting devices are side by side, and the third and fourth transporting devices are side by side, the intermediate transporting device can be a conveyor, or the like, that carries the articles being sorted, or a diverter capable of extending across and diverting articles being carried by a conveyor extending between the upstream transporting devices and the downstream transporting devices, or the like. When the first transporting device is above the second transporting device, and the third transporting device is above the fourth transporting device, the intermediate transporting device can be a conveyor, or the like, that carries the articles being sorted. In all cases, it is preferred for the axis of rotation of the intermediate transporting device to be movable.

While this invention has been described in detail with particular reference to preferred embodiments thereof, it will be understood that modifications and variations may be made without departing from the scope of the invention as defined in the appended claims.

What is claimed is:

1. An article transferring apparatus, comprising:
a transporting device comprising a transporting surface operative for carrying articles in a longitudinal direction between an upstream end and a downstream end of said transporting device;
an elongate diverter operative for pivoting about an axis of rotation that is generally perpendicular to said transporting surface, and further operative for moving said axis of rotation laterally relative to said transporting device to achieve a plurality of diverting orientations, said diverter extending at least partially across said transporting surface in each of said diverting orientations and said diverter being operative for moving an article carried by said transporting surface at least partially laterally across said transporting surface to at least one of a plurality of destinations in each of said diverting orientations;
wherein said diverter comprises opposite ends and opposite sides, and is operative to frictionally drive articles along either of said sides in a direction defined from one of said opposite ends to the other of said opposite ends, and
a controller operative to move said diverter between said diverting orientations.

2. The apparatus of claim 1, wherein each of said opposite ends is operative for translating laterally relative to said transporting device independent of each other.

3. The apparatus of claim 1, wherein said diverter comprises a first end and a second end, and and wherein each of said ends is operative for translating laterally relative to said transporting device so as to position said axis of rotation intermediate said ends.

4. The apparatus of claim 1, wherein:
said diverter further comprises:
an upstream end that is more proximate to said upstream end of said transporting device than to said downstream end of said transporting device, and
a downstream end that is more proximate to said downstream end of said transporting device than to said upstream end of said transporting device;
the apparatus further comprises:
an upstream drive connected to said diverter and operative to move said upstream end of said diverter, and
a downstream drive connected to said diverter and operative to move said downstream end of said diverter; and
said controller is operative to move said downstream drive independently of said upstream drive so that said downstream drive moves relative to said upstream drive, and operative to move said upstream drive independently of said downstream drive so that said upstream drive moves relative to said downstream drive.

5. The apparatus of claim 4, wherein:

said upstream drive is operative to move said upstream end of said diverter laterally relative to said transporting device so that said axis of rotation is proximate to said downstream end of said diverter; and said downstream drive is operative to move said downstream end of said diverter laterally relative to said transporting device so that said axis of rotation is proximate to said upstream end of said diverter.

6. The apparatus of claim 4, wherein each of said upstream drive and said downstream drive is a linear drive.

7. The apparatus of claim 1, wherein:

said diverter further comprises:

an upstream end that is more proximate to said upstream end of said transporting device than to said downstream end of said transporting device, and a downstream end that is more proximate to said downstream end of said transporting device than to said upstream end of said transporting device;

said transporting device is an intermediate transporting device;

the apparatus further comprises:

a plurality of downstream transporting devices, each having an upstream end proximate to said intermediate transporting device, and an upstream transporting device, said upstream device having a downstream end proximate to said intermediate transporting device; and said controller is operative to define at least some of said plurality of diverting orientations by alternately orienting said downstream end of said diverter toward each of said downstream transporting devices, and alternately orienting said upstream end of said diverter toward opposite sides of said upstream transporting device so that opposite sides of said diverter alternately encounter and direct articles.

8. The apparatus of claim 7, wherein:

said diverter comprises a driven, continuous belt operative for frictionally driving the articles carried by said transporting surface; and said controller is operative to drive said belt in a first direction when a first side of said opposite sides of said diverter encounters and directs articles, and drive said belt in a second direction, which is opposite from said first direction, when a second side of said opposite sides of said diverter encounters and directs articles.

9. An article transferring apparatus, comprising:

a transporting device comprising a transporting surface operative for carrying articles in a longitudinal direction between an upstream end of said transporting device and a downstream end of said transporting device;

an elongate diverter comprising opposite ends, one mounted for transverse movement along said upstream end of said transporting device and the other mounted for transverse movement along said downstream end of said transporting device, said diverter further comprising a first side surface operative to frictionally drive articles along said diverter and a second side surface operative to frictionally drive articles along the diverter; and a controller operative to move said opposite ends of said diverter, said diverter being movable between:

a first diverting orientation in which said first side surface extends at least partially across said transporting surface, faces at least partially upstream and frictionally drives articles at least partially toward a first side of said transporting device, and a second diverting orientation in which said second side surface extends at least partially across said transporting surface, faces at least partially upstream and frictionally drives articles at least partially toward a second side of said transporting device that is opposite from said first side of said transporting device.

10. The apparatus of claim 9, wherein:

said diverter comprises a continuous belt that defines said first side surface and said second side surface; and said controller is operative to alternately drive said belt in a first direction while said diverter is in said first diverting orientation and an opposite second direction when said diverter is in said second diverting orientation.

11. The apparatus of claim 10, wherein said belt extends generally perpendicularly from proximate to said transporting surface.

12. The apparatus of claim 10, wherein said transporting surface and said continuous belt move at approximately the same speed.

13. An article transferring apparatus, comprising:

a transporting device comprising a transporting surface operative for carrying articles in a longitudinal direction between an upstream end of said transporting device and a downstream end of said transporting device;

an elongate diverter comprising a diverting surface operative for extending at least partially across said transporting surface to define a plurality of diverting orientations, said diverter being operative in each of said diverting orientations for causing articles carried by said transporting device to be directed at least partially laterally across said transporting surface;

said diverting surface defining a first effective length while said diverting surface is in a first diverting orientation, wherein said first effective length is the total distance along said diverting surface that an article travels while said diverting surface is contacting and directing the article to a first destination, and said diverting surface defining a second effective length while said diverting surface is in a second diverting orientation, wherein said second effective length is different from said first effective length and is the total distance along said diverting surface that an article travels while said diverting surface is contacting and directing the article to a second destination, which is different from said first destination.

14. The apparatus of claim 13, further comprising a controller for causing said diverter to alternately define said first effective length and said second effective length.

15. The apparatus of claim 14, wherein said diverter is operative for moving across said transporting surface between said first diverting orientation and said second diverting orientation, and said effective length varies in response to said movement across said transporting surface.

16. The apparatus of claim 14, wherein:

said diverter comprises opposite ends; and said controller is operative for decreasing the distance between said opposite ends to define said first effective length, and operative for increasing the distance between said opposite ends to define said second effective length.

17. The apparatus of claim 16, wherein:

said diverter comprises a continuous belt that extends between said opposite ends and that defines said diverting surface; and the apparatus further comprises an accumulator operative for accumulating and releasing excess portions of said belt as the distance between said opposite ends is varied.

18. The apparatus of claim 13, wherein said transporting device comprises a longitudinally extending diverting zone, and a greater length of said diverter extends from said diverting zone while said diverter is in said second diverting orientation than while said diverter is in said first diverting orientation.

19. The apparatus of claim 18, wherein said diverter is movably mounted to a carriage that moves back and forth relative to said transporting device so that at least one end of said diverter reciprocates relative to said carriage as said carriage moves back and forth relative to said transporting device.

20. An article transferring apparatus, comprising:

a transporting device comprising a transporting surface operative for carrying articles in a longitudinal direction between an upstream end of said transporting device and a downstream end of said transporting device;

an elongate diverter operative for extending at least partially across said transporting surface and causing articles carried by said transporting device to be directed at least partially laterally across said transporting surface, said diverter comprising opposite first and second ends around which a continuous belt travels, wherein said first end is movable toward and away from said second end to vary the length of said diverter so that there is an excess portion of said belt and an active portion of said belt; and a belt accumulator comprising a first accumulator roller that at least a portion of said excess portion of said belt extends at least partially around, wherein said first accumulator roller is operative for moving generally parallel to the elongate axis of said diverter for accumulating and releasing said excess portion of said belt in response to movement of said first end relative to said second end.

21. The apparatus of claim 20, wherein said belt accumulator further comprises a biasing means for biasing said first accumulator roller in the direction of said movement for accumulating said excess portion of said belt.

22. The apparatus of claim 20, Wherein:

said diverter further comprises a first diverter roller and a second diverter roller, both of which are proximate to said first end of said diverter;

said first accumulator roller is intermediate of said first end and said second end of said diverter, and is movable toward and away from said first and second diverter rollers; and said belt extends at least partially around said first diverter roller, at least partially around said first accumulator roller, and at least partially around said second accumulator roller.

23. The apparatus of claim 22, wherein:

said first accumulator roller is closer to said first end of said diverter than said second end of said diverter;

said diverter further comprises a third diverter roller and a fourth diverter roller, both of which are proximate to said second end of said diverter;

said accumulator further comprises a second accumulator roller that is closer to said second end of said diverter than to said first end of said diverter, is intermediate of said first end and said second end of said diverter, and is movable toward and away from said third and fourth diverter rollers;

said belt extends at least partially around said third diverter roller, at least partially around said second accumulator roller, and at least partially around said third accumulator roller; and the apparatus further comprises a device for moving said first and second accumulator rollers toward and away from each other to at least partially accumulate and release said excess portion of said belt.

24. The apparatus of claim 23, wherein said device for moving said first and second accumulator rollers toward and away from each other comprises a biasing means for biasing said first accumulator roller and said second accumulator roller toward one another.

25. An article transferring apparatus, comprising:

a plurality of upstream transporting devices, comprising a first transporting device and a second transporting device;

a plurality of downstream transporting devices, comprising a third transporting device and a fourth transporting device; and a diverting device positioned at least partially between said upstream transporting devices and said downstream transporting devices, said diverting device comprising an upstream end and a downstream end, opposite sides being operative to frictionally drive articles along either of said sides, and being operative for moving said upstream end between said first transporting device and said second transporting device and said downstream end between said third transporting device and said fourth transporting device to define a plurality of diverting orientations comprising:

a first diverting orientation in which said upstream end is proximate to said first transporting device and said downstream end is proximate to said fourth transporting device so that said diverting device is capable of diverting articles from said first transporting device to said fourth transporting device, and a second diverting orientation in which said upstream end is proximate to said second transporting device and said downstream end is proximate to said third transporting device so that said diverting device is capable of diverting articles from said second transporting device to said third transporting device.

26. The apparatus of claim 25, wherein:

the apparatus further comprises a sixth transporting device having a transporting surface extending at least partially between said upstream transporting devices and said downstream transporting devices, wherein said sixth transporting device is operative for carrying the articles in a longitudinal direction; and said diverting device moves across said transporting surface to define said diverting orientations and is operative to divert the articles at least partially laterally across said transporting surface.

27. The apparatus of claim 26, further comprising a controller operative to move said diverting device between said diverting orientations.

28. A method for transferring articles, comprising the steps of:

transporting articles on a plurality of upstream transporting devices; and transporting and diverting the articles from the upstream transporting devices to a plurality of downstream transporting devices, the diverting step comprising the steps of:

moving a diverter into a first diverting orientation in which the upstream end of the diverter is proximate to a first transporting device of the upstream transporting devices, and the downstream end of the diverter is proximate a second transporting device of the downstream transporting devices, by transversely moving a first end of said diverter, so that the diverter is capable of frictionally driving and diverting articles from the first transporting device to the second transporting device, and pivoting the diverter from the first diverting orientation to a second diverting orientation in which the upstream end of the diverter is proximate to a third transporting device of the upstream transporting devices and the downstream end of the diverter is proximate to a fourth transporting device of the downstream transporting devices, by transversely moving a second end of said diverter, so that the diverter is capable of frictionally driving and diverting articles from the third transporting device to the fourth transporting device;

wherein the third transporting device is generally aligned with the second transporting device and the fourth transporting device is generally aligned with the first transporting device.

29. The method of claim 28, wherein:

the method further comprises the steps of operating a fifth transporting device to carry the articles in a longitudinal direction;

the first diverting orientation is achieved by positioning the diverter across the surface of the fifth transporting device so that the diverter directs articles that continue to be carried by the fifth transporting device at least partially laterally across the surface of the fifth transporting device toward the second transporting device; and the second diverting orientation is achieved by positioning the diverter across the surface of the fifth transporting device so that the diverter directs articles that continue to be carried by the fifth transporting device at least partially laterally across the surface of the fifth transporting device toward the fourth transporting device.

30. The method of claim 28, further comprising the step of moving the diverter out of the path of the articles, wherein the fifth transporting device is arranged so that while the diverter is not in the path of the articles the fifth transporting device carry the articles from the third transporting device to the second transporting device, and from the first transporting device to the fourth transporting device.

31. A method for transferring articles, comprising the steps of:

transporting articles in a longitudinal direction on a transporting surface;

pivoting a frictionally driving diverter across the transporting surface about an axis of rotation that is generally perpendicular to the transporting surface; and moving the axis of rotation laterally relative to the transporting surface to achieve a plurality of diverting orientations in which the diverter engages and causes articles carried by the transporting surface to be directed at least partially laterally across the transporting surface toward a plurality of destinations frictionally driving the articles with said diverter.

32. The method of claim 31, further comprising a step of moving a first end of the diverter relative to a second end of the diverter.

33. The method of claim 31, further comprising the step of moving the axis of rotation to a plurality of predetermined points positioned generally laterally across said transporting surface.

34. A method for transferring articles, comprising the steps of:

transporting articles in a longitudinal direction defined from upstream to downstream on a transporting surface;

pivoting a diverter across the transporting surface into a first diverting orientation in which a first side of the diverter extends at least partially laterally across the transporting surface and faces at least partially upstream, by transversely moving a first end of said diverter;

frictionally driving articles with the first side of the diverter so that the articles move at least partially laterally toward a first side of the transporting surface while the diverter is in the first diverting orientation;

pivoting the diverter across the transporting surface into a second diverting orientation in which a second side of the diverter, which is opposite from the first side of the diverter, extends at least partially laterally across the transporting surface and faces at least partially upstream, by transversely moving a second end of said diverter; and frictionally driving articles with the second side of the diverter so that the articles move at least partially laterally toward a second side of the transporting surface while the diverter is in the first diverting orientation.

35. The method of claim 34, wherein the diverter comprises a continuous diverter belt that defines the first side and the second side of the diverter, and the method further comprises the steps of driving the diverter belt in a first direction while the diverter is in the first diverting orientation and driving the diverter belt in an opposite second direction while the diverter is in the second diverting orientation.

36. The method of claim 35, further comprising the step of moving the transporting surface and the diverter belt at approximately the same speed.

37. A method of transferring articles, comprising the steps of:

transporting the articles in a longitudinal direction along a transporting surface;

orienting a diverter in a first orientation characterized by the diverter extending at least partially across the transporting surface in the path of an article traveling in the longitudinal direction so that the article is directed to a first destination by the diverter, the diverter defining a first effective length that is the total distance that the article travels along the diverter while the diverter is in the first orientation; and orienting the diverter in a second orientation characterized by the diverter extending at least partially across the transporting surface in the path of an article traveling in the longitudinal direction so that the article is directed by the diverter to a second destination which is different from the first destination, the diverter defining a second effective length that is the total distance that the article travels along the diverter while the diverter is in the second orientation.

38. The method of claim 37, wherein the orienting steps comprise the step of moving the diverter across the transporting surface, and the effective length of the diverter is responsive to the moving of the diverter across the transporting surface.

39. The method of claim 38, wherein the orienting steps further comprise the steps of:
decreasing the distance between opposite ends of the diverter to define the first effective length; and
increasing the distance between the opposite ends of the diverter to define the second effective length.

40. The method of claim 39, wherein:
the diverter comprises a continuous driven belt that extends between the opposite ends of the diverter and frictionally drives the articles; and
the method further comprises the steps of accumulating and releasing excess portions of the belt as the distance between the opposite ends is varied.

41. The method of claim 38, wherein the orienting steps further comprises the steps of:
maintaining the length of the diverter approximately constant so that the length of the diverter in the first orientation is approximately identical to the length of the diverter in the second orientation;
moving at least a section of the diverter away from the path of the articles to define the first orientation, so that the section of the diverter does not come into contact with the articles in the first orientation; and
moving the section of the diverter into the path of the articles to define the second orientation, so that the section of the diverter comes into contact with the articles in the second orientation.

42. An article transferring apparatus, comprising:
a transporting device comprising a transporting surface operative for carrying articles in a longitudinal direction between an upstream end and a downstream end of said transporting device;
an elongate diverter comprising opposite ends and operative for pivoting about an axis of rotation that is generally perpendicular to said transporting surface, and further operative for moving said axis of rotation laterally relative to said transporting device to achieve a plurality of diverting orientations, said diverter extending at least partially across said transporting surface in each of said diverting orientations, and said diverter being operative for moving an article carried by said transporting surface at least partially laterally across said transporting surface to at least one of a plurality of destinations in each of said diverting orientations by frictionally driving said article in a direction defined from one of said opposite ends to the other of said opposite ends; and
a controller operative to move said diverter between said diverting orientations.

43. The apparatus of claim 42, wherein each of said opposite ends is operative for translating laterally relative to said transporting device independent of each other.

44. An article transferring apparatus, comprising:
an intermediate transporting device comprising a transporting surface operative for carrying articles in a longitudinal direction between an upstream end and a downstream end of said intermediate transporting device;
an upstream transporting device, said upstream device having a downstream end proximate to said intermediate transporting device;
a plurality of downstream transporting devices, each having an upstream end proximate to said intermediate transporting device;
an elongate diverter comprising an upstream end that is more proximate to said upstream end of said intermediate transporting device than to said downstream end of said intermediate transporting device and a downstream end that is more proximate to said downstream end of said intermediate transporting device than to said upstream end of said intermediate transporting device;
said diverter being operative for pivoting about an axis of rotation that is generally perpendicular to said transporting surface, and further operative for moving said axis of rotation laterally relative to said intermediate transporting device to achieve a plurality of diverting orientations, said diverter extending at least partially across said transporting surface in each of said diverting orientations, and said diverter being operative for moving an article carried by said transporting surface at least partially laterally across said transporting surface to at least one of said plurality of said downstream transporting devices in each of said diverting orientations; and
a controller operative to define at least some of said plurality of diverting orientations by alternately orienting said downstream end of said diverter toward each of said downstream transporting devices, and alternately orienting said upstream end of said diverter toward opposite sides of said upstream transporting device so that opposite sides of said diverter alternately encounter and direct articles.

45. The apparatus of claim 44, wherein:
said diverter comprises a driven, continuous belt operative for frictionally driving the articles carried by said transporting surface; and
said controller is operative to drive said belt in a first direction when a first side of said opposite sides of said diverter encounters and directs articles, and drive said belt in a second direction, which is opposite from said first direction, when a second side of said opposite sides of said diverter encounters and directs articles.

* * * * *